United States Patent
White

[11] 4,068,927
[45] Jan. 17, 1978

[54] ELECTROPHORESIS DISPLAY WITH BURIED LEAD LINES

[75] Inventor: Roger Paul White, Yonkers, N.Y.

[73] Assignee: North American Philips Corporation, New York, N.Y.

[21] Appl. No.: 719,604

[22] Filed: Sept. 1, 1976

[51] Int. Cl.² ............................................. G02F 1/19
[52] U.S. Cl. ............................... 350/160 R; 313/513; 315/169 R; 340/336; 350/267
[58] Field of Search .................... 204/180, 299; 350/160 R, 267; 313/232, 358, 513; 315/169 R, 169 TV, 363; 340/324 R, 336

[56] References Cited

U.S. PATENT DOCUMENTS

| Re. 28,360 | 3/1975 | Evans et al. ............. 315/169 TV X |
| 3,756,693 | 9/1973 | Ota .................................. 350/160 R |
| 3,772,013 | 11/1973 | Wells ........................... 350/160 R X |
| 3,892,568 | 7/1975 | Ota .................................. 340/336 X |
| 3,909,116 | 9/1975 | Kohashi .............................. 350/267 |

*Primary Examiner*—Eugene R. La Roche
*Attorney, Agent, or Firm*—Frank R. Trifari; Norman N. Spain

[57] ABSTRACT

A multisegmented electrophoretic display such as a numerical display in which the lead lines are hidden from the observer's view and prevented from having a switching function by separating the lead lines from the electrophoretic suspension by means of an insulating and a conducting layer.

7 Claims, 2 Drawing Figures

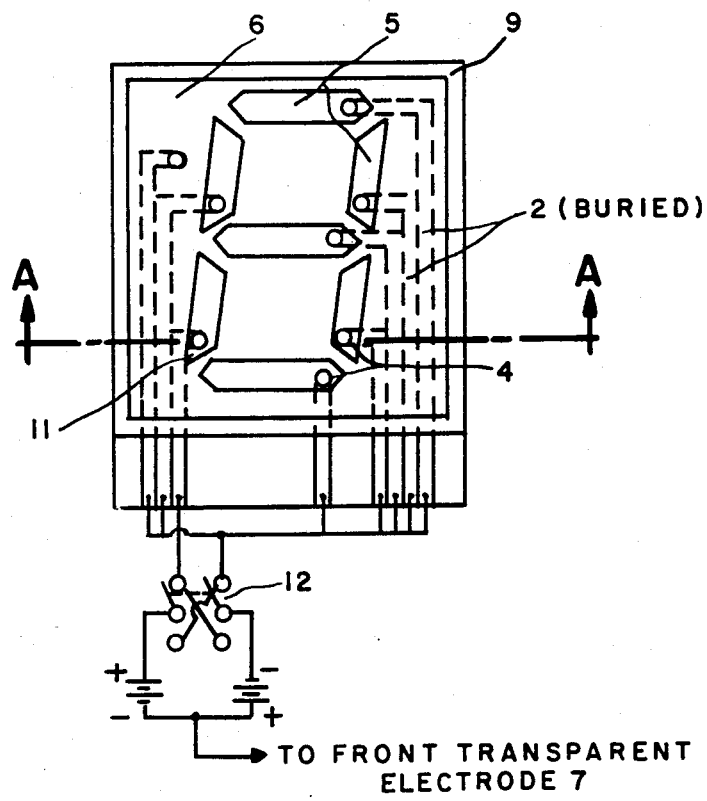
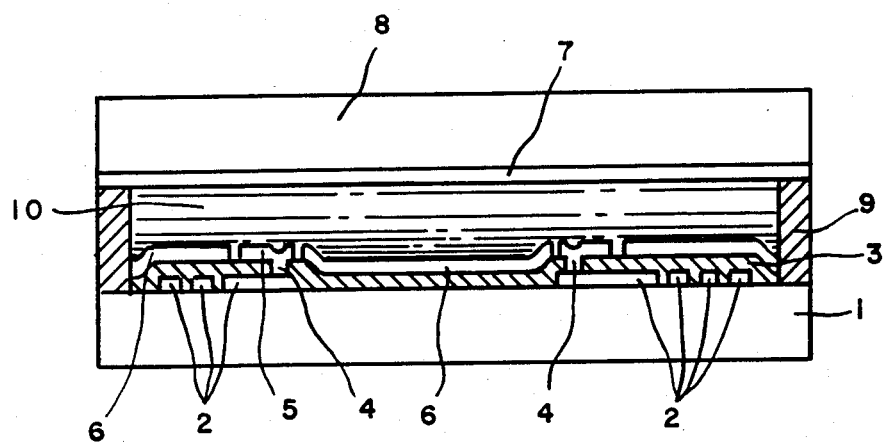

ELECTROPHORESIS DISPLAY WITH BURIED LEAD LINES

BACKGROUND OF THE INVENTION

This invention relates to an improved multisegmented electrophoretic image display cell or an EPID cell. EPID cells are known in the art and are described for example in Ota, U.S. Pat. No. 3,792,308 and Ota et al, Proceedings of the IREE Vol. 61, No. 7, July 1973, pages 832–836.

An EPID cell of the type employed in the invention is composed of charged light reflecting pigment particles suspended in a dark colored liquid sandwiched between a front, transparent electrode and a back electrode, patterned into segments, and a field or background electrode.

By applying a D.C. field across the suspension, the particles are moved to one or the other of the electrodes depending upon the polarity of the charged particles.

For example, in the area of negatively charged pigments when the front transparent electrode is at ground potential, the field electrode is positive, the selected segment electrodes are negative and the non-selected segment electrodes are positive, the particles in the area of the selected segment electrodes are repelled to the front transparent electrode while the other particles in the area of the positively charged field and non-selected segment electrodes are attracted to those electrodes. The observer, viewing through the transparent electrode, sees the shape of the selected segmented electrodes due to the deposited layer of light reflecting particles on a dark background, since the dark suspension liquid hides the pigment attracted to the field electrode and the non-selected segment electrodes. By switching the polarity so that the selected electrode segments are positive and the field and non-selected segment electrodes are negative, the position of the pigment is reversed so that the observer now sees the selected electrode segment as a dark image on a light background.

A problem with these EPID devices arises from the fact that lead lines conducting current from the power source to the electrode segments themselves act as electrodes and tend to attract or repel the charged pigment and thus become visible to the observer and detract from the appearance of the desired image.

In order to hide these lead lines, cut-out masks have been placed between the observer and the display or the part of the transparent electrode facing the lead lines is painted over with an opaque paint.

These methods have not proven to be too successful, as the difficulty of matching the color of the mask or paint to the color of the suspension liquid often detracts from the appearance of the EPID cell, particularly when employed in such a consumer item as a clock.

Another problem is that the use of masks or opaque paints is not possible in those EPID cells where it is desired to reverse the tone of the background and the segmented electrodes by reversing their polarity.

SUMMARY OF THE INVENTION

A principal object of this invention is to provide an improved system for preventing unwanted switching caused by the lead lines and thus hide the lead lines in EPID cells from the observer.

Another principal object of the invention is to provide a method for hiding lead lines in an EPID cell independently of changes in tone between the segmented electrodes and the background.

These and other objects of the invention will be apparent from the description of the invention that follows:

According to the invention, the lead lines are separated from the field electrode and segmented electrodes by means of an electrically insulating layer through which there are conductive channels or vias connecting the lead lines to the field or segment electrodes.

On the EPID cell of the invention, the surface of the insulating layer is coated with the field and segment electrodes which are in contact with the suspension, while the lead lines are separated from the suspension by the electrode and insulating layers. By this construction, an electrical field is prevented from being developed between the lead lines and the front transparent electrode.

Thus there is no repelling or attracting of pigment to the transparent electrode due to the lead lines and the lead lines are effectively hidden from the observer.

Further, when the polarity of the segment and field electrodes is reversed, and the tone of the selected segment electrodes and the non-selected segment and background electrodes is reversed, the lead lines are still not visible to the observer, as a switching function of the lead lines is prevented from taking place by means of the isolating layers.

An example of an insulating layer that may be employed is a developed photoresist layer, one surface of which is in contact with lead lines and on the opposing surface of which is deposited the field electrode and segment electrodes electrically connected to the lead lines through electrically conductive channels or vias through the insulating layer.

The insulating layer is not restricted to a photoresist. It can be one of a large variety of insulator materials, SiO, MgO, or a polymeric film for example teflon, polyethylene, polystyrene, polypropylene or polycarbonate.

Another aspect of the invention involves a novel method for forming the lead lines, field electrode, and segment electrodes.

According to this aspect of the invention, an electrically conductive coating such as indium oxide or tin oxide on an electrically non-conductive substrate such as glass is selectively etched to form the lead lines. The lead lines are then coated with a photosensitive layer such as Shipley AZ 1350J. This photosensitive layer is then selectively exposed with the aid of a photomask and the resultant exposed photoresist is then developed, leaving exposed channels or vias to the lead lines. A thin layer of an electrically conductive metal such as aluminum, or chromium is deposited on the photoresist for example by evaporation or electroless deposition or an electrically conductive metal oxide such as tin oxide or indium oxide by sputtering or by electroless deposition in such a manner that the walls of the vias or channels are completely metal plated thereby forming electrical paths between the metal layer and the lead lines. A second photosensitive layer is then deposited on the metal layer, is exposed according to a desired configuration and arrangement of the segment and field electrodes and then developed. The exposed portions of the metal layer are then removed by etching and the resultant second photoresist is then removed leaving the segment electrodes and background or field electrodes arranged on the first photoresist layer and except through the vias, they are isolated from the lead lines by means of this photoresist layer.

BRIEF DESCRIPTION OF THE DRAWINGS

FIG. 1 is a plan view of a substrate bearing electrode segments, field electrode and lead lines for use in the electrophoretic display device of the invention.

FIG. 2 is a cross-sectional view of an electrophoretic display device of the invention taken through section A—A of FIG. 1.

DETAILED DESCRIPTION OF THE INVENTION

Referring to FIG. 2 of the drawing, the construction of a numeric display device of the invention is as follows:

A piece of glass substrate 1 (approximately 2 × 3 inches) coated on one surface with a thin transparent layer of indium oxide (for example Neastron glass manufactured by Pittsburgh Plate Glass Company) is cleaned and the indium oxide layer is coated with photosensitive layer of Shipley AZ 1350J on a spin coater at 2500 RPM and is prebaked at 45° C for 6 minutes. Using the appropriate mask for the lead lines the photosensitive layer is exposed to UV light for approximaterly 3 minutes.

After exposure, the resultant photoresist is developed in a Shipley developer for approximately 20 seconds, given a water rinse and baked at 120° C for 1½ hours. The exposed portion of the indium oxide layer is then etched in hydrochloric acid at 45° C for approximately 1½ minutes and then rinsed with water. A fill hole is then drilled into a corner of the glass substrate 1 using a diamond core drill. The present photoresist is then removed leaving the glass substrate 1 coated with indium oxide lead lines 2.

A photosensitive layer of Shipley AZ 1350J is applied over the lead lines 2 and substrate 1 and pre-baked at 45° C for 6 minutes. The resulting photoresist layer 3 is then exposed to UV light for approximately 3 minutes using the appropriate mask for the vias, developed with Shipley developer and rinsed with distilled water, vias 4 or channels leading to lead lines 2 through photoresist 3 thus being formed. The substrate 1 is now baked for 1 hour at 120° C.

A layer of aluminum approximately 1000A thick is evaporated on the photoresist 3. The resultant aluminum layer is coated with a photosensitive layer of Shipley AZ 1350J, prebaked at 45° C for 6 minutes and exposed to UV light for approximately 3 minutes using the appropriate masks for the numerical segment electrodes.

The resulting photoresist is developed in Shipley developer and rinsed with distilled water.

The exposed portions of the aluminum layer are etched in 16 parts of phosphoric acid, 2 parts of nitric acid, 2 parts of acetic acid and 1 part of H₂O, rinsed with H₂O and blown dry with nitrogen. The remaining portion of the photoresist is exposed to UV light, developed off leaving exposed the numerical segment electrodes 5 and field electrode 6 formed from the aluminum layer. The substrate is then rinsed with distilled water and blown dry with nitrogen.

A syringe needle is sealed with epoxy to the fill hole, in the substrate 1. The substrate 1 is then sealed to the front electrode 7 consisting of a layer of indium oxide on a glass substrate 8, (2¼ inches × 3 inches) while separated from glass substrate 1 by 2 mil teflon shims. The substrate 1 is then tacked to the front electrode at four places along the periphery of the display. The epoxy is then cured, the teflon shims are removed and the remainder of the periphery between the substrate 1 and the front electrode 7 is sealed with epoxy seal 9. 41

The resultant cell is filled through the syringe needle with an electrophoretic suspension 10 consisting of 15 cc of a 7:3 mixture of perchlorethylene: xylene with the specific gravity adjusted to 1.41, 420 mgs of diarylide yellow pigment, 40 mgs of Sudan Red - 4 BA dye and 210 mgs of FC-170-fluorinated alkyl polyoxyethylene ethanol (1%) or FC-430-fluorinated alkyl esters (1% by wt.) commercially available from 3M as a charging agent for conferring a negative charge on the pigment and the needle is cut off and sealed with epoxy.

Application of −50 volts dc to segment electrode 11 in FIG. 1 and +50 volts dc to the remaining segment and field electrodes with respect to the front transparent electrode 7 caused the negatively charged pigment in the area of negatively charged segment electrode 11 to be attracted to the more positive front transparent electrode 7 while the negatively charged pigment in the area of the positively charged remaining segment and field electrodes is attracted to those electrodes. This forms a bright yellow display in the shape of the segment electrode 11 against an opaque red background while no part of the lead lines 2 were visible in the display. Upon reversal of the voltage polarities, by reversing switch 12 so that the segment electrode 11 was at +50 volts and the remaining segment and field electrodes was at −50 volts with respect to the front transparent electrode 7 the pigment in the area of segment electrode 11 was attracted to the now positive electrode and the pigment in the areas of the remaining segment and field electrodes are attracted to the now more positive front electrode producing a display with the shape of segment electrode 11 as opaque red against a bright yellow background while no part of the lead lines 2 were visible in the display.

An example of the use of the tone reversal mode of operation is in the operation of a digital clock using EPID cells for the display. A four digit clock has been constructed wherein the tone reversal is implemented once every second providing a "seconds" indicator for the clock.

What I claim is:

1. An electrophoretic visual display device comprising:

An electrophoretic suspension comprising an opaque insulating liquid containing, in suspension, pigment particles of a contrasting color to that of said liquid and generally of a single polarity;

a first transparent electrode;

at least one segmented electrode and a field electrode having major surfaces in opposition to the major surface of said first transparent electrode and spaced therefrom by at least one thin insulating member;

said electrodes and said insulating members together forming a cell for containing said electrophoretic suspension;

said electrophoretic suspension positioned in said cell;

an insulating layer in contact with the surfaces of said segmented and field electrodes in reverse to those in opposition to said first transparent electrode, said insulating layer being provided with electrically conductive channels providing electrically conductive passages from said segmented and field electrodes through said insulating layer;

voltage supply means for supplying a reversible electric field between said first transparent electrodes and said segmented electrode;

electrical lead lines positioned on the surface of said insulating layer remote from said segmented and field electrode and electrically connected thereto through said electrically conductive channels and electrically conductive means electrically connecting said lead lines to said voltage supply means.

2. The electrophoretic visual display device of claim 1 wherein the insulating layer is an inorganic dielectric material.

3. The electrophoretic visual display device of claim 1 wherein the first transparent electrode is a thin coating of a transparent electrically conductive material on the surface of a transparent electrically insulating substrate.

4. The electrophoretic display device of claim 1 wherein the insulating layer is a polymeric material.

5. The electrophoretic visual display device of claim 1 having a reversible tone.

6. The electrophoretic visual display device of claim 1 wherein the segment and field electrodes are formed of a metal.

7. The electrophoretic visual display device of claim 4 wherein the segment and field electrodes extend through said electrically conductive channels and form the electrically conductive paths through said channels.

* * * * *